May 9, 1950     J. D. McCRUMM ET AL     2,507,036
VEHICLE WINDSHIELD
Filed Aug. 23, 1948     2 Sheets-Sheet 1
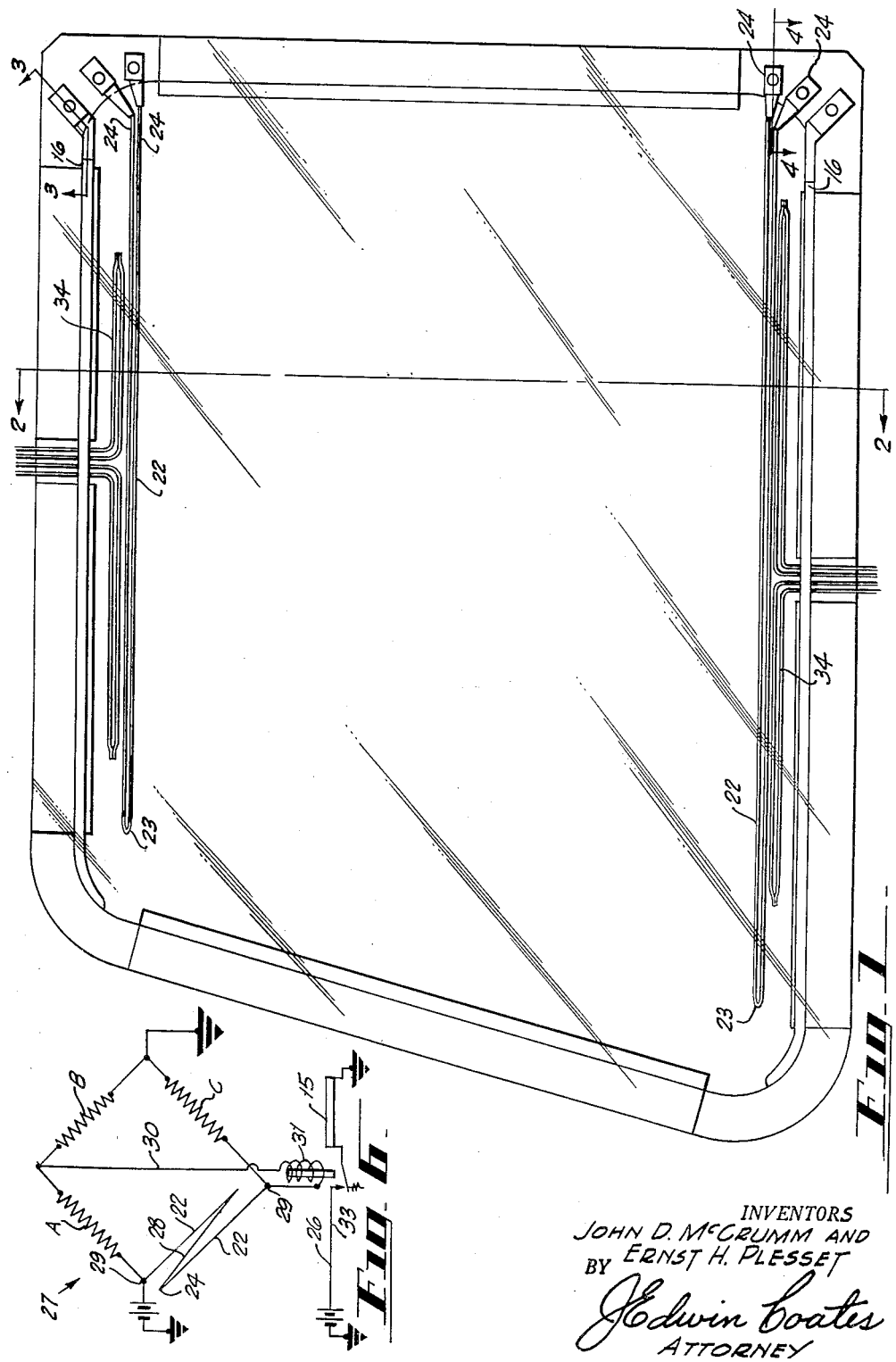
INVENTORS
JOHN D. McCRUMM AND
BY ERNST H. PLESSET
Edwin Coates
ATTORNEY May 9, 1950 J. D. McCRUMM ET AL 2,507,036
VEHICLE WINDSHIELD
Filed Aug. 23, 1948 2 Sheets-Sheet 2
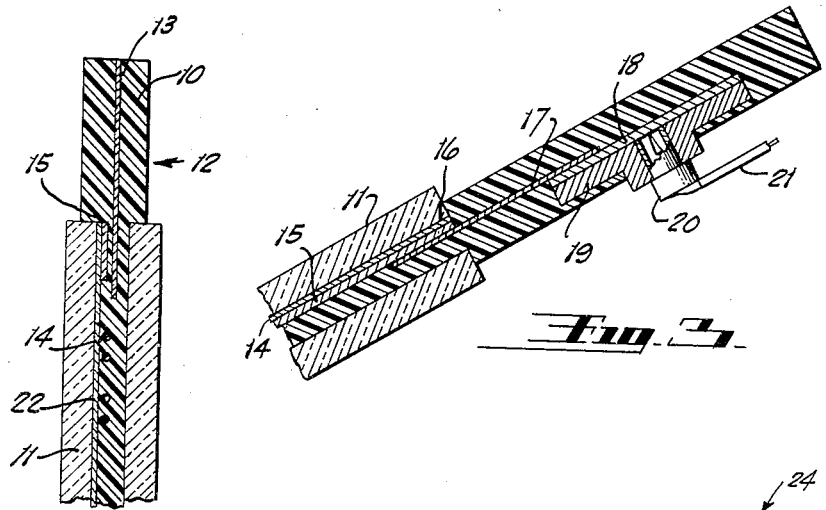
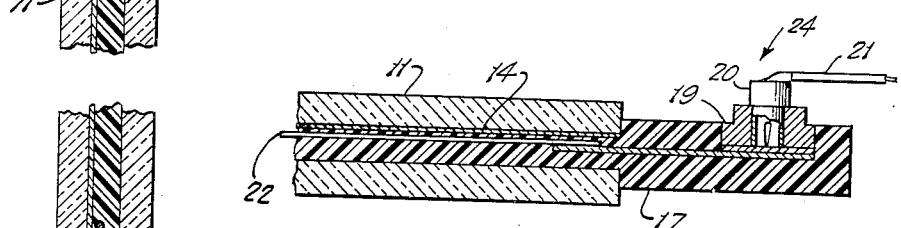
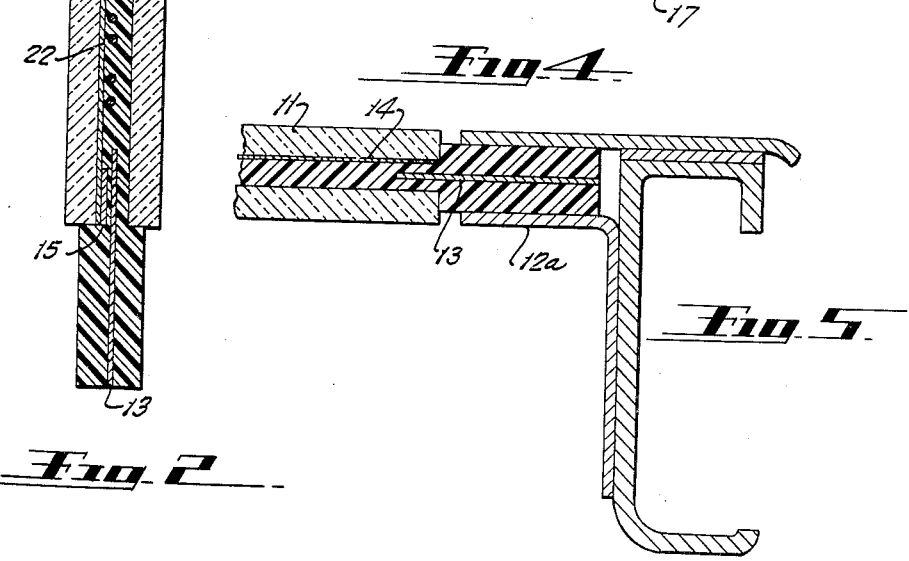
INVENTORS
JOHN D. McCRUMM AND
BY ERNST H. PLESSET
Edwin Coates
ATTORNEY Patented May 9, 1950

2,507,036

UNITED STATES PATENT OFFICE 2,507,036

VEHICLE WINDSHIELD

John D. McCrumm, Swarthmore, Pa., and Ernst H. Plesset, Sherman Oaks, Calif., assignors to Douglas Aircraft Company, Inc., Santa Monica, Calif.

Application August 23, 1948, Serial No. 45,644

2 Claims. (Cl. 219—19)

This invention relates to windshields for aircraft and other vehicles operating during weather conditions in which ice tends to form on the windshield. Although the windshield of the present invention is particularly adapted for aircraft as ice formations on the windshields of aircraft is more of a problem than on land vehicles, the windshield herein disclosed can, nevertheless, be used on any vehicle subject to icing conditions in use.

The prevention of ice formation on the windshields of aircraft poses problems not to be found on land vehicles. Contemporary windshields used on aircraft comprise a laminated structure commonly consisting of a layer of polyvinyl butyral encased between two plates of tempered glass.

Various means have heretofore been proposed for the prevention and removal of ice formations on aircraft windshieds. One of the most commonly used means has consisted of a mechanical wiper which also distributes an alcohol fluid-freezing-point depressant over the surface wiped. There are definite limits to the de-icing ability of such a means and, of course, no protection at all is afforded after the supply of fluid is exhausted.

Another system previously used for preventing ice formation on the windshields of aircraft consisted of two glass panels separated by an air gap through which heated air was passed. In most instances the heated air was introduced at one edge of the windshield and after passing between the two panels was discharged directly into the cockpit over adjacent windows for defogging those windows. The inner panel was usually of impact resistant construction and the outer panel designed for maximum heat transfer consistent with mechanical strength.

Optically this windshield had inherent defects because of the multiplicity of light images occasioned by the two additional air-to-glass surfaces. A distinct disadvantage was the high temperature and mass of air flow required to provide the necessary thermal energy for combatting severe icing conditions. The high temperature necessary in many cases over-heated the polyvinyl butyral plastic in the impact resistant panel and caused small permanent bubbles to form. Furthermore, the high temperature appreciably reduced the impact strength of the laminated panel which also radiated excessive heat to the pilot's face.

It has also been proposed to embed small resistance wires in the form of a grid in the windshield, generally in the vinyl plate between the two sheets of glass forming the laminated structure. Although such windshields tend to prevent the formation of ice, they have not been adopted for a number of reasons. Optically, there are two deterrents to this windshield. First, the closely spaced wires of the grid produced eye fatigue, and secondly and of greater importance is the optical distortion caused by the local heating of the vinyl in the region of the wires. This produced localized variations of the index of refraction of the vinyl and severely distorted objects viewed through the windshield. It was found that the extent of distortion was proportional to the temperature gradient, and provision of sufficient heat for anti-icing under moderate or extreme conditions often rendered the windshield optically useless.

As polyvinyl butyral tends to absorb infa-red rays, anti-icing windshields have been heretofore proposed in which such rays are projected against the windshield from some suitable source. The location of the source was one of the major problems presented by this system. The difficulty in obtaining even heat distribution over the windshield also presented an installation problem which, with the fire hazard inherent in operating the source at a suitable high temperature, severely limited the adoption and use of such anti-icing systems.

The windshield of the present invention is formed of a plate of polyvinyl butyral encased between two panels of glass and is provided with means for applying heat to the outer panel of glass without the disadvantages inherent in the previously proposed windshield in which the glass was heated in use. The heat may be applied by means of a substantially transparent, electrically conductive film or layer applied to the entire one surface of the outer panel of the windshield although in the now preferred form of the invention, an outer panel is used which is provided with a special surface formed by an integral outermost "boundary layer" on one of the faces of the same, and having such a chemical and physical nature as to leave the glass panel substantially transparent while enabling said surface to conduct electricity and heat. The resistance of the layer is such when a predetermined current is passed therethrough as to generate heat of a temperature sufficient to maintain the exposed surface of the outer glass panel at a temperature above the freezing temperature of water. As the layer is substantially transparent the optical properties of the windshield are not impaired by the layer.

Although the application of the electrically conductive layer to the exposed surface of the outer glass panel would produce a more efficient windshield, it has been found that the increased efficiency introduces problems not present when the layer is applied to the inner face of the glass in engagement with the vinyl plate. With the layer carried by the inner face of the outer glass panel the polyvinyl butyral is subjected to the heat generated within the layer and the polyvinyl butyral is thus held at temperature higher than it would be if the layer were applied to the outer face of the panel. As the impact strength of the windshield is greatest when the vinyl is held at a temperature of the order of 110° F. a very efficient anti-icing windshield having a high impact strength can be had by forming a layer on the inner surface of the outer panel.

Electrical connection with the layer is established by means of a narrow opaque bus applied as a coating to the surface of the electrically conductive film. The bus is preferably located lengthwise on opposite edges of the windshield and is substantially coextensive therewith. The bus should be of sufficient thickness to permit a suitable copper lead to be soldered thereto and brought out to serve as a terminal connection member.

The temperature of the polyvinyl butyral can be determined by embedding suitable thermocouples within this plastic sheet and spacing the thermocouple junctures at spaced points throughout the windshield. The thermocouple leads can be attached to conventional instruments which are calibrated to read in degrees.

The current input to the layer is preferably controlled through suitable temperature measuring means embedded within the polyvinyl butyral. These means in the now preferred embodiment of the invention comprise resistance wires extending substantially the length of the windshield and formed of a material the resistance of which will change in accordance with the change in the temperature of the wire. The change in the resistance of the wire can be used through suitable balancing bridge circuits to automatically control the current input to the layer.

As both the thermocouples and the resistance wires can be located closely adjacent the edges of the windshield they do not obscure the vision of the pilot or cause eye fatigue as do the embedded heating wires of previously proposed windshields.

Other features and advantages of the present invention will be apparent from the following description taken in connection with the accompanying drawing, in which:

Figure 1 is a front view of a windshield panel constructed according to the present invention, the panel being shown demounted from the vehicle enclosure frame;

Figure 2 is a vertical section of the panel, taken on line 2—2 of Figure 1 and sighting in the direction of the arrows;

Figure 3 is a transverse section of one of the upper corners of the panel, taken on line 3—3 of Figure 1;

Figure 4 is a transverse section of one of the lower corners of the panel, taken on the line 4—4 of Figure 1;

Figure 5 is a transverse section taken near one corner of the panel mounted in a supporting frame by means of the polyvinyl butyral margin so as to take advantage of the vibration-suppressing nature of the polyvinyl, and Figure 6 is a diagrammatic view of a bridge-operated polarized relay provided for controlling the current to the upper bus.

Although the construction of the present panel will be described in connection with its employment as an aircraft cockpit enclosure member, it will be readily perceived from such description that a panel incorporating the same constructional principles may be equally well employed and for substantially the same purposes, as a windshield or enclosure member for any type of vehicle.

The panel shown essentially comprises three transparent planar members arranged in parallelism in facewise contact to form a unit. One of the planar members consists of a sheet 10 of transparent polyvinyl butyral or its structural and optical equivalent, which is laminated with two parallel sheets 11 of transparent tempered glass to the adjacent faces of which the opposite faces of the butyral sheet are suitably united, whereby to provide a transparent windshield panel. By virtue of the present invention, this panel is rendered impact-resistant and heat stress balanced and is so heated as to prevent water in any of its solid forms, such as ice, frost, snow or sleet, from accumulating thereon.

The area of the butyral sheet is greater than that of the glass sheets and the butyral hence protrudes beyond the peripheries of the glass sheets all around its edges, thus providing a peripheral margin 12 on the panel. This margin is thicker than the portion of butyral sheet included between the glass sheets and defines sockets in the front and rear face of the butyral sheet for the insertion of the glass sheets therein. The inner periphery of the annular mounting frame 12a is provided with spaced, parallel flanges defining a socket into which the polyvinyl butyral margin is adapted to fit for supporting the panel. Since the butyral is preferably itself laminated, in the well known manner, and then heated to render it transparent and relatively flexible, this margin absorbs vibratory shocks transmitted to it either from the frame or the body of the panel, substantially in the manner disclosed in Patent No. 2,293,656 to T. H. McClain, issued August 18, 1942, thereby to render the mounting and panel vibration-proof, so that it will not "rattle" or become damaged.

As seen in Figure 2, each of the opposite edges of the butyral sheet has an elongate strip 13 of rigid metallic material such as stainless steel, embedded medially thereof parallel to opposite faces of the butyral sheet and extending from the marginal edge of the butyral a short distance into the portion of the butyral sheet that lies between the glass sheets. These strips serve as shear-resistant bars or strips and strengthen the butyral margin and thus minimize the possibility of the panel breaking loose from the frame and blowing back into the pilot's face.

The entire inner face of the outer panel of the windshield is covered by a substantially transparent, electrically conductive film or layer, 14, this film in the presently preferred embodiment of the invention, consisting of a special surface formed by an integral outermost "boundary layer" on the inner face of said panel, this layer having such chemical and physical natures as to leave the glass panel substantially transparent while enabling said surface to conduct electricity and heat. This surface is of a vitreous glasslike nature, with an index of refraction of substantially 2.0 and has substantially all the characteristics of a metallic semi-conductor, except that its dielectric constant is high at low frequencies and low at optical frequencies. Chemically this surface or boundary layer in one of its forms is a material in the class of glass but containing a metallic element, for example, tin, in close association with the glass and compounded according to a process known to Pittsburgh Plate Glass Company and by them identified under the trade name of "Nesa." More specifically, the boundary region 14 can be either of the nature disclosed in Technical Glass Bulletin No. 15 of The Pittsburgh Plate Glass Company or of the nature disclosed in Patent No. 2,429,420 granted October 21, 1947, to Harold A. McMaster, "Conductive coating for glass and method of application." As described in this patent, the material added to the glass is such as to provide it with a boundary surface substantially consisting of tin oxide having a thickness substantially equal to that of a half-wavelength of light and tenaciously adherent to the glass. It can be formed on the glass by heating the latter approximately to the softening point and then immersing it in a liquid composed of one part glacial acetic acid, one part absolute alcohol and two parts stannic chloride, all taken by volume, and thereafter heating to 120° C. to 130° C. The glass is allowed to remain in the liquid only a few seconds, whereupon it is removed and cooled in open air.

However, it is to be understood that the invention contemplates that this boundary layer, or separation or division layer or surface or film, be composed of any material having a chemical and physical nature such as to enable it to entirely cover the glass sheet and to conduct electricity and by its electrical resistance, generate heat, while leaving the completed sheet and layer transparent and optically clear. Although the outer surface of the windshield can be more easily held at the desired temperature if the layer is deposited on this surface, it has been found that greater light transmission is obtained when the layer is formed on the inner surface of the outer glass panel.

In order to apply electrical energy to the layer to induce resistance heating thereof and thereby to both maintain the temperature of the front sheet of glass above the freezing point of water while also maintaining the butyral core sheet at its optimum impact resistant temperature that is, in the neighborhood of 110° F., a narrow, elongate bus 15 is disposed transversely of the panel at the upper and lower edges thereof and extends substantially co-extensively with these edges. The busses are composed of an electrically conductive material which can be applied directly to the layer 14 by brushing on and hence may consist of a silver paste or silver solution, or it may be electroplated on in the manner of a mirror backing or silvering, and hence can also be composed of a silver amalgam. The bus is thus electrically conductive and heat resistant. The one end 16 of each bus is suitably united to the adjacent inner end of a thin strip of copper foil 17, the outer end of which is soldered to the adjacent inner end of a copper plate 18 of heavier gage than the foil. The plate 18 is soldered to the under face of a heavy electrical socket-member 19, centrally apertured to receive a plug-type contact terminal 20 of the split cylinder type. To the upper end of each of these plugs 20 is soldered the inner end of an electrical lead wire or cable 21, the outer ends of which are suitably connected, via balancing bridge means hereinafter described, to a suitable source of electrical energy in the vehicle.

In order to regulate the input of current to the upper bus so as to regulate the heating of the layer 14, current control means actuatable in response to the change of temperature of the butyral sheet and of the front sheet of glass are provided. These means include a temperature measuring, or thermally responsive, element 22 embedded in the upper portion of the butyral sheet 16 and extending transversely thereof inwardly adjacent, and parallel to, substantially the entire length of the upper and lower edges of the butyral sheet. In the embodiment shown, these temperature measuring elements take the form of bare looped resistance wires, each wire having its looped end 23 disposed adjacent the one edge of the elongate butyral sheet and its two current-passing terminals 24 disposed adjacent the opposite edge of the butyral sheet, and constructed like those for the buses. The wires are composed of a material the resistance of which varies with the temperature of the wire; that is, when the temperature of the wires is low, their resistance is low, and vice versa. The wires 22 also should preferably have constant resistance properties under periods of long service. In order that there may be as little lag in the response of the wires to the temperature of the film as is consistent with durability of the wires, they are preferably disposed quite close to the front face of the butyral sheet, yet not so close as to be in direct heat-transfer contact with the current-conducting layer 14.

The temperature responsive resistance of the wires 22 is employed to control the current input to the upper bus from a suitable source, not shown, of electrical energy through a conductor 25 including a cut-out switch 26. To this end, simple balancing bridge circuits, such as those indicated by way of example at 27 in Figure 6 are employed to open and close the conductor path from the energy source to the upper bus. These actuating circuits are arranged in the form of a Wheatstone bridge, the fourth leg of which is constituted by the two wires 22 connected in series by a conductor 28, the series connected wires 22 being inserted in the bridge by means of connections 29. The two opposite sides of the bridge are connected by a conductor path 30. In this latter path is inserted a polarized relay 31, of the type that will close only when the resistances 22 decrease in temperature and resistance. The spring loaded arm 32 of the relay is normally held away from the solenoid thereof in the normally balanced condition of the bridge, and is thus maintained out of contact with the lead 33 from the energy source. The bridge is maintained normally balanced by virtue of the fact that the front sheet of glass and the wires 22 are normally above the freezing point of water, wherefore the resistance of wires 22 remains relatively sufficiently high to balance the bridge and prevent current flowing in conductors 29 and 30. When, however, the temperature of wires 22 falls sufficiently, their resistance falls sufficiently to effect unbalancing of the bridge, current therefore passing to the relay solenoid, wherefore the arm 32 is drawn by the solenoid into contact with lead 33, energizing the upper bus 15.

Thus, when the temperature of the front surface of the front sheet of glass falls to the neighborhood of the icing point, the system including the temperature measuring resistance wires 22 and the balancing bridge circuits automatically connect the bus bars and the film 14 to the source of electrical energy and maintains them connected thereto as long as the ambient atmosphere and weather conditions necessitate maintaining the windshield above the freezing point of water. When, however, this necessity passes, the system automatically disconnects the bus and film 14 from the energy source in the manner described.

Accordingly, there is little likelihood of the windshield becoming coated with water in its solid state, either as a frost, ice, sleet or snow crystals but such particles are deposited on the windshield to effect a lowering of the temperature of the outer glass sheet to the neighborhood of freezing (as when the airplane is grounded or if the switch is inadvertently left in its "off" position), the heating system automatically operates to melt same off, and as long as atmosphere or weather conditions are such as to cool the front sheet to the freezing point of water, it will automatically be heated up above this point. The panel thus serves both as an anti-icing and as a de-icing windshield, since it can be operated by contact of cool air with the outer glass as well as by actual deposit of water in its solid form thereon.

The invention also contemplates rendering the panel resistant to impacts such as those occurring when it encounters a flying bird or some other airborne object. To this end, the invention provides thermocouple means for continuously maintaining the butyral sheet at its optimum impact-resistant temperature, which is of the order of 110° F. At this temperature, the butyral is in its best condition for absorbing or balancing and dissipating or spreading the shocks applied to the outer sheet of glass and for preventing these stresses from reaching the inner sheet of glass. That is to say, when the butyral sheet is at this temperature, it relieves the glass sheets of local stresses or balances these stresses and prevents these glass sheets from concentrating the impact force at any one locality, distributing it evenly throughout the glass sheet.

Being constructed and disposed as described herein above the wires 22 are adapted to accurately measure, and respond quickly to, the temperature of the front sheet of glass to control the flow of current thereto but naturally are unable to measure the average heat of the butyral sheet existing in the vertical center plane of said sheet. In order to ascertain whether the temperature of the butyral sheet is at its optimum value and is conferring impact resisting properties on the windshield, suitable thermocouples 34 are provided and embedded in the butyral sheet. Each thermocouple extends transversely of the butyral sheet near the upper and lower edges thereof out of the pilot's field of vision. The thermocouples should be composed of materials which will generate an adequate current when heated and yet be resistant to high temperatures, etc. The outer terminals 35 of each of the thermocouples are led to a suitable temperature indicating instrument, not shown, but of any well known type suitable for the purpose.

Although the thermocouples can not, of course, control the input of current to the film 14, they do, by means of the indicating instruments, enable the crew to determine whether the windshield is in the proper condition for resisting impacts and for anti-icing, that is, for preventing the formation of ice thereon. If, as before take-off, the airplane and windshield have been standing exposed to the sun, without the butyral thereby being elevated to the desired temperature of 110° F., the pilot may, by closing a normally open switch or the like provided in a conventional branch circuit extending from the energy source to the upper bus bar, insure that the windshield will be at the desired temperature before take-off. Thus, if the windshield should encounter an airborne obstacle or a snow flurry before the windshield has fallen to a temperature sufficiently low to operate the control system, the pilot may, by closing the aforesaid switch quickly raise the windshield to this temperature.

The aforedescribed construction affords many advantages. With the windshield-heating layer 14 borne by the inner face of the outer sheet of glass and in heat transferring contact with the butyral sheet, the latter is held at a relatively higher impact-resistance conferring temperature than otherwise possible. Since the thermocouples and the temperature measuring control wires are located closely adjacent the upper and lower edges of the windshield, they leave a wide view field of the windshield clear and unobscured, freeing the pilot from blind spots and relieving him from eye strain or fatigue that would otherwise ensue. The heating of the film on the butyral and of the glass is effected in a uniform manner and without the formation of a multiplicity of reflected light images occasioned by the usual two air-to-glass surfaces, and the butyral, being free of direct-contacting heat elements, is relieved of bubbles usually formed therein under such general circumstances. Optical distortion caused by localized heating of the butyral in the region of the grid wires is also obviated. The difficulty experienced when infra-red systems are employed and consisting for one thing in locating the source of infra-red rays, is entirely eliminated and uneven heat distribution problems and the fire hazard are completely missing.

Various departures from the specific configuration and nature of the elements and combinations disclosed are contemplated by the invention and all lie within the scope of the annexed claims.

We claim:

1. A laminated, transparent closure, comprising: inner and outer layers of glass bonded to an interlayer of transparent plastic material having a peripheral margin protruding laterally outwardly of the glass layers and of low specific cohesivity and relatively high brittleness at relatively low temperatures; means for electrically heating the closure disposed on the inner face of the outer layer of glass and extending from one margin thereof to another; means operatively connected with the first-said means for conducting electrical current heatingly through the first-said means; and a reinforcing member disposed in each of the marginal edges of said interlayer and having its inner portion lying in lateral overlap with and close thicknesswise adjacency to, the first-said means and extending outwardly therefrom substantially to the outer edge of each of the marginal portions; said heating means serving to maintain the closure clear of water-obscurations and prevent excessively low temperatures of said marginal portion, and said reinforcing members serving to strengthen said marginal portion against structural failure.

2. A laminated, transparent closure, comprising: inner and outer layers of glass bonded to an interlayer of transparent plastic material having a peripheral margin protruding laterally of the glass layers and composed of a material apt to become brittle at low temperatures; a transparent layer of electrically-conductive resistance heating material disposed on the inner face of the outer layer of glass and extending from one margin thereof to another in contact with said interlayer; current-conducting means extending in lengthwise contact with the opposed edges of said electrically conductive layer; and a substantially rigid, shear-resisting reinforcing plate disposed in each of the marginal edges of said interlayer and having its inner portion lying in close lateral and thicknesswise adjacency to said transparent layer and extending outwardly therefrom substantially to the outer edge of each of the marginal portions; said heating means serving to maintain said outer glass layer at a temperature sufficient to prevent the retention of water-form deposits thereon and to maintain the marginal portions of said plastic-material at a temperature sufficient to prevent disintegration thereof at relatively low ambient temperatures, and said reinforcing members serving to strengthen said marginal portions against structural failure.

JOHN D. McCRUMM.
ERNST H. PLESSET.

REFERENCES CITED

The following references are of record in the file of this patent:

UNITED STATES PATENTS

| Number | Name | Date |
|---|---|---|
| 2,021,661 | Kisfaludy | Nov. 19, 1935 |
| 2,429,420 | McMaster | Oct. 21, 1947 |
| 2,562,207 | Mershon | Feb. 22, 1949 |
| 2,465,312 | Mershon | Mar. 22, 1949 |
| 2,467,349 | Van Daam | Apr. 12, 1949 |
| 2,470,633 | Mershon | May 17, 1949 |